United States Patent [19]

Whatley, Jr.

[11] 3,965,956

[45] June 29, 1976

[54] BUMPER MOUNTED SPRING DRIVEN TIRE INSTALLER AND REMOVER

[75] Inventor: Norman Whatley, Jr., Littleton, Colo.

[73] Assignee: Lawrence Peska Associates, Inc., New York, N.Y. ; a part interest

[22] Filed: June 17, 1975

[21] Appl. No.: 587,548

Related U.S. Application Data

[63] Continuation of Ser. No. 428,849, Dec. 27, 1973, abandoned.

[52] U.S. Cl. ............................................. 152/214
[51] Int. Cl.² ......................................... B60C 27/14
[58] Field of Search ............ 152/213 R, 213 A, 214, 152/215; 81/15.8

[56] References Cited
UNITED STATES PATENTS

| | | | |
|---|---|---|---|
| 1,257,647 | 2/1918 | Spahn | 152/214 |
| 1,573,283 | 2/1926 | Sutter | 152/214 |
| 1,862,378 | 6/1932 | Howard | 152/215 |
| 2,608,231 | 8/1952 | Johnson | 152/215 |

*Primary Examiner*—Al Lawrence Smith
*Assistant Examiner*—Roscoe V. Parker

[57] ABSTRACT

An adjustable rear bumper mounted device for installing and removing tire chains from vehicles. The device is secured at one end to the rear bumper or similar portion of the car, and carries an elongated belt, webbing or the like wrapped and wound up on a take-up reel which is under spring bias tension. The outer end of the belt is fastened to the rear end of the tire chain, while the front end of the tire chain is fastened releasably to wheel clamps, so that as the car is moved forwardly, the tire chain is wound about the tire for being secured together at its ends when the rotation is completed. The wheel clamps may be either magnetic for holding the end of the tire chain to each side of the ferrous steel wheel, or "H" shaped to clamp onto spokes of "Mag" type wheels.

7 Claims, 9 Drawing Figures

U.S. Patent June 29, 1976 3,965,956
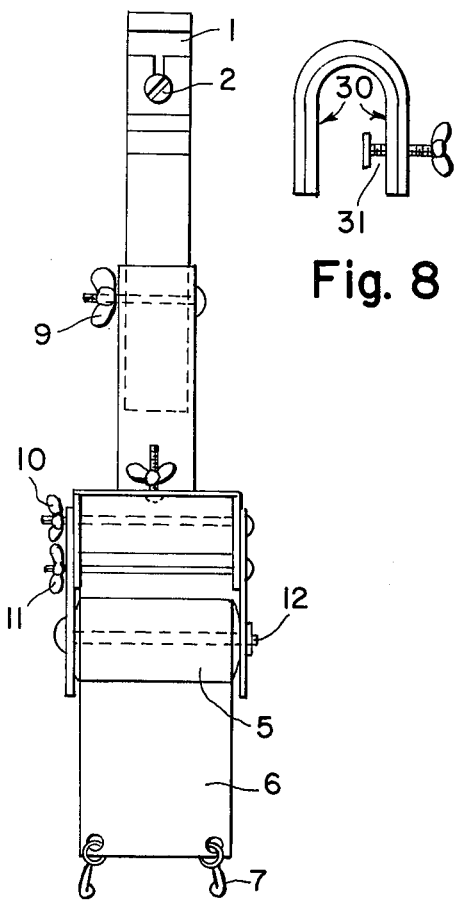
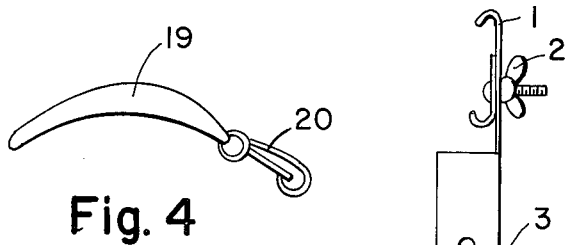
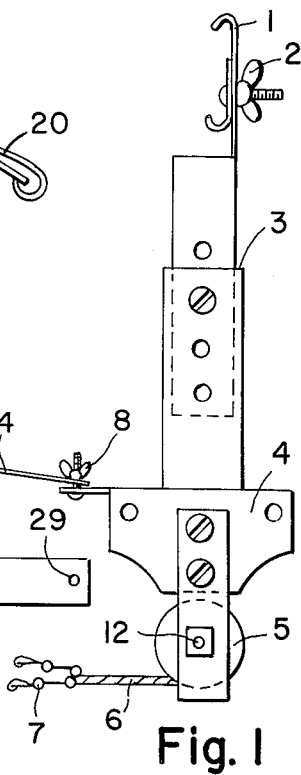
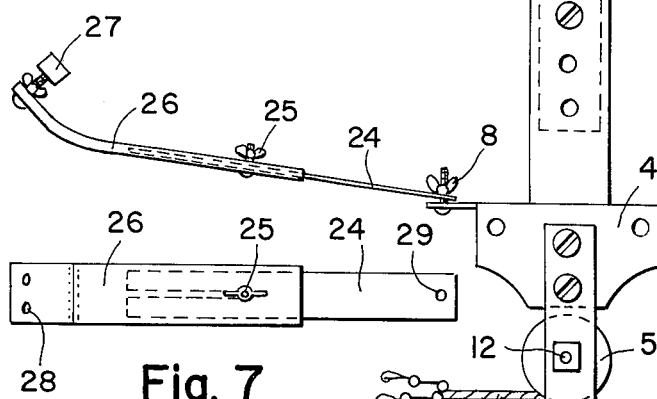
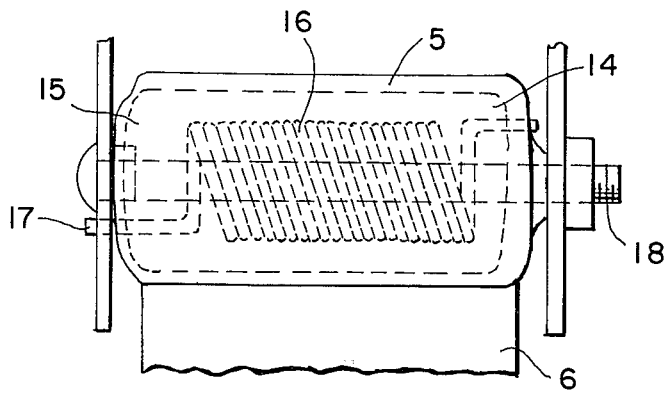
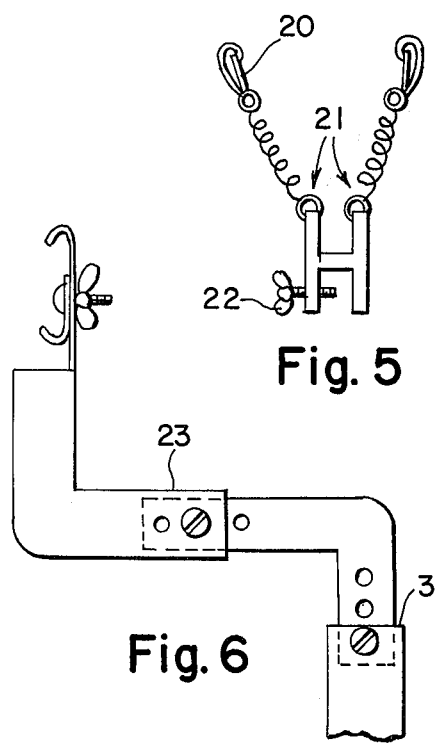
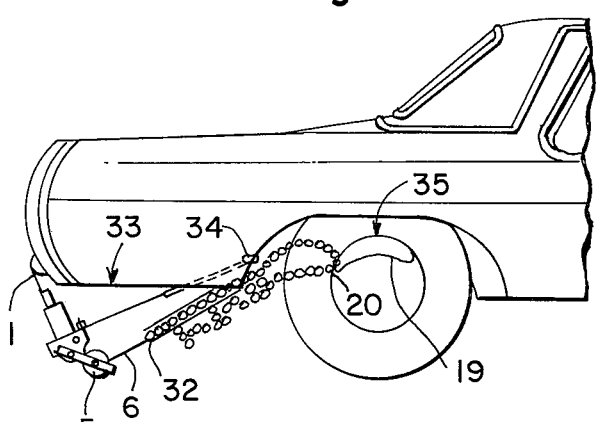

BUMPER MOUNTED SPRING DRIVEN TIRE INSTALLER AND REMOVER

This application is a continuation of Ser. No. 428,849, filed Dec. 27, 1973, and now abandoned.

SUMMARY OF THE INVENTION

During the winter season, snowfalls and ice covered roads often create hazardous road conditions that necessitate the installation of tire chains on the motor vehicle for road travel. While snow tires have been resorted to in recent years, it still remains the general opinion of experts and truck and taxi drivers that where there is ice and snow, the protection is still tire chains. Installing or removing the tire chains at roadside usually presents adversities that the average motorist is not prepared for nor desires since the conventional method of manually installing or removing the tire chains is not an easy feat. Even when the vehicle jack is employed to lift the vehicle, the process still involves considerable time, effort and danger since the ground may be soft and the vehicle slip off the jack. Because of this, many motorists hire professional help when available or attempt do do without the tire chains or drive with them when not actually needed. It is to be noted that in many towns and cities, certain streets are designated "snow streets" and on which during snow or ice conditions, cars without chains or snow tires are forbidden to travel. The present inventions discloses a solution to these problems for the assistance of the average motorist or lone traveler.

An object of the invention is to provide a novel and improved device for installing tire chains on the traction wheels or motor vehicles, tractors, aircraft and the like and for easily removing them.

Another object of the present invention is to provide a novel and improved device for installing and removing tire chains for motor vehicles and other vehicles, which employs the power of the vehicle itself to facilitate installation of the tire chains, so that all the driver has to do is to arrange the chains with the installing mechanism and move the vehicle to easily and quickly install the chain.

A further object of the present invention is to provide a novel and improved tire chain installing device in which magnetic means are employed to releasably secure the initial ends of the tire chains about the tire and wheel, and so that on moving the vehicle, the tire chain is taken up about the tire and readily fastened from its second end, the magnetic holding means being then easily removed for further use.

Still another object of the present invention is to provide a tire chain installing and removing device, in which there is bracket means engageable from the rear end of the tire chain to the rear bumper of the car to position the tire chain, and resilient spring or other means for maintaining constant spring bias on the tire chain to insure good and close fit to the tire itself during the installation process.

Another object of the present invention is to provide a novel and improved, compact, readily assembled tire chain installer and removal device, that while itself is simple in operation, will greatly simplify the mechanical process so that the average motorist may easily and rapidly install or remove his tire chains at any time or place, in minimum time, with minimal effort and exposure to the elements.

Still a further object of the present invention is to provide a novel and improved tire chain installer and remover in use of which the driver does not have to get down in the snow, mud and wetness to soil his clothes and shoes to handle the device.

Another object of the present invention is to provide a novel and improved tire chain installer and remover which is simple in design, formed for few parts and may be made at low cost by mass production methods.

BRIEF DESCRIPTION OF THE DRAWINGS

The above and other objects, features and advantages of the present invention will become apparent from the following description of the accompanying drawings, wherein:

FIG. 1 is a vertical side view of the device;

FIG. 2 is a vertical front view of the device of FIG. 1;

FIG. 3 is a somewhat enlarged scale cutaway view of the spring roller assembly with take-up belt;

FIG. 4 is a horizontal view of the invention's banana shaped magnetic wheel clamps for steel wheels;

FIG. 5 is a vertical front view of the invention's "H" shaped spoke clamp for use on Mag type wheels;

FIG. 6 is a vertical side view of the device with horizontal side view of complemental "Z" shaped extension sleeve;

FIG. 7 is a top detail plan view of the chain slide chute;

FIG. 8 is an enlarged vertical top view of the slide chute's fender clamp, and

FIG. 9 is a partial side elevational view of a motor vehicle with the device installed in the initial steps of emplacing the tire chains thereon.

DESCRIPTION OF THE PREFERRED EMBODIMENTS

In order to clearly understand the nature of the present invention, and the best means for carrying it out, reference may be had to the drawings, in which like numerals denote similar parts throughout the several views.

FIG. 9 shows a partial side elevation of the rear portion of a motor vehicle to which the tire chains are to be attached. The various parts of the invention are also shown in the other views.

In FIG. 1, there are shown the major components of the device of the present invention, including the adjustable shaft 3 positioned on the stationary shaft above the holder 4 of the roller assembly 5 with take-up belt 6. The adjustable bumper clamp 1, secured by bolt and butterfly nut 2 is an extended part of the adjustable shaft 3. This shaft is also secured by a bolt and butterfly nut as illustrated in FIG. 2 at 9. The holder 4 of the take-up belt and roller assembly has three positions for securing the mounting brackets of the assembly. The brackets can swivel to the front, middle and back positions on the assembly.

The brackets are secured to the holder 4 by two bolts with butterfly nuts, as illustrated in FIG. 2 at 10 and FIG. 2 at 11. The take-up belt 6 and roller assembly 5 are driven by the heavy duty spring 16 shown in FIG. 3, the spring being wound in a counterclockwise direction. The roller 5 consists of two cylindrical compartments 14 and 15, as seen in FIG. 3, which are secured and ride the bolt type axle 12 of FIG. 2. The smaller compartment 15 seen in FIG. 3 is immobilized by bolting the compartment to the left hand side of the compartment. The appropriate end of the heavy duty spring 16 is secured at the exterior side of the bracket, as illustrated at 17 in FIG. 3, by passing through the compartment by means of a hole of relative size, also shown in FIG. 3.

The other end of the heavy duty spring is secured to the exterior of the larger compartment 14 of FIG. 3. The larger compartment is designed to rotate on the axle 18 and to enclose the smaller compartment. Rotating action is controlled by the heavy duty spring. The assembly and heavy duty spring is designed to provide the well known window shade effect of pull to extend with automatic retraction for the take-up belt.

The take-up belt is only mounted on the larger rotating compartment of the two compartments in the roller assembly. The belt is mounted in such a way that its leading end will always extend from the bottom of the roller assembly so that the rotating compartment that it is mounted on will always turn clockwise, when the belt is pulled out and turn counterclockwise when the belt retracts. The clockwise action of the rotating compartment causes the heavy duty spring to expand outwards from its normal rest position and generate an opposing counterclockwise force that continuously draws the belt tight or taut.

The open eye swivel snaps 7 affixed to the take-up belt's leading end at 6 in FIG. 1 are for connecting the rearmost links of the tire chains, as shown in FIG. 9 at 32.

A connector 8 seen in FIG. 1 is the connector for mounting the adjustable slide chute described herein and below. FIG. 4 shows the banana shaped magnetic wheel clamps 19 that are integral parts of the invention and are to be utilized for quick releasable mounting to the conventional type steel wheels. The magnetic clamps mount on the wheel rims in the same manner as conventional wheel balancing weights with the open eye swivel snaps 20 of FIG. 4 being connected to the leading links of the tire chains, as shown at 35 in FIG. 9.

FIG. 5 shows the "H" shaped clamp for clamping to one of the spokes of "Mag" type wheels. The clamps have spring connected open eye swivel snaps 20 and a butterfly headed tightening bolt 22. The "H" clamp will complement the invention in the same manner for "Mag" wheels, that the banana shaped magnetic clamps complement the invention for conventional steel wheels.

The invention is complemented in FIG. 6 by adding the adjustable "Z" shaped extension sleeve at 23 and in FIG. 1 by adding the adjustable chain slide chute at 8 and 24 through 27.

For vehicles such as Volkswagens, where the rear tires are situated close to the rear bumper, the adjustable "Z" shaped extension sleeve will be used to effect the necessary distance between the body of the bumper clamped invention and the extended chains.

In cases where the fender construction or wheel well construction of the vehicle obstructs the smooth transfer of the tire chains from the invention to the tires, the chain slide chute will be utilized as a means to provide smooth and unimpeded transfer of the chains. FIG. 7 at 24 and 26 shows the chute is of two piece construction with both sections shaped to a quarter moon configuration, widthwise and wide enough to accommodate the width of the tire chains when extended. The larger section 26 houses the smaller sliding section 24 and both are secured by the locking butterfly wing nut as shown at 25 in FIG. 7.

General installation of the slide chute is illustrated in FIG. 9 at 33. Shown at 27 in FIG. 1 is the "U" shaped rubber line fender clamp that is further illustrated in its enlarged version in FIG. 8. In FIG. 8, 30 shows the rubber lining of the fender clamp, while at 31 is shown the butterfly securing mechanism. The "U" shaped clamp is generally mounted to the fender in a sandwiching fasion as shown at 34 in FIG. 9.

At 27 and 28 in FIG. 7, are shown the fender clamp's mounting holes in the slide chute, as appropriately selected when servicing the right or left wheel of the vehicle. At 29 in FIG. 7 is shown the mounting hole for securing the slide chute to the invention's roller assembly holder as shown at 8 in FIG. 1.

Although I have described a preferred embodiment of the present invention, in specific terms, it is understood that there are many changes, modifications and improvements that can be made herein without departing from the spirit and scope of the invention as herein claimed.

What is claimed is:

1. A device for installing and removing tire chains from the wheels and tires of a vehicle, comprising
   first clamp means for engaging a rear body portion of the vehicle,
   tire chain means for engaging wrappingly around a tire of a vehicle for protecting it against skidding on roads, paths and pavements,
   second magnetic clamp means for engaging a forward end of said tire chain means and constructed and arranged for being releasably secured to a traction supporting member of said vehicle,
   elongated take-up belt means engaging at its forward end portion to said tire chain means at a rearward end portion thereof, and
   roller assembly means engaging said take-up belt means and said first clamp means for rolling up said tire chain means about and upon said traction supporting member.

2. A device for installing and removing tire chains from the wheels and tires of a vehicle in accordance with claim 1, wherein
   said traction supporting member is an automobile wheel made of ferrous iron and sheet material, and
   wherein said second magnetic clamp means comprises
   at least one magnetized clamp member for magnetically adhering to said ferrous portion of said automobile wheel.

3. A device for installing and removing tire chains from the wheels and tires of a vehicle in accordance with claim 1, wherein
   said second magnetic clamp means comprises
   at least two magnetized clamp members for magnetically adhering to both sides of the ferrous portion of said automobile wheel.

4. A device for installing and removing tire chains from the wheels and tires of a vehicle, comprising
   first clamp means for engaging a rear body portion of the vehicle,
   tire chain means for engaging wrappingly around a tire of a vehicle for protecting it against skidding on roads, paths and pavements,
   second clamp means for engaging a forward end of said tire chain means and constructed and arranged for being releasably secured to a traction supporting member of said vehicle, elongated take-up belt means engaging at its forward end portion to said tire chain means at a rearward end portion thereof, roller assembly means engaging said take-up belt means and said first clamp means for rolling up said tire chain means about and upon said traction supporting member and wherein said traction supporting member is an automobile wheel of a "Mag" type of construction including radial spokes, and metal rims, and wherein said second clamp means comprises substantially hollow "U" shaped clamp body portion with a web and depending sidewalls for extending over and being secured to at least one of the spokes of said wheel, and releasable screw bolt means carried by said sidewall for securing said second clamp means releasably to said wheel, and thus releasably clamping the forward end of said tire chain to said wheel during installation thereof.

5. A device for installing and removing tire chains from the wheels and tires of a vehicle comprising first clamp means for engaging a rear body portion of the vehicle, tire chain means for engaging wrappingly around a tire of a vehicle for protecting it against skidding on roads, paths and pavements, second clamp means for engaging a forward end of said tire chain means and constructed and arranged for being releasably secured to a traction supporting member of said vehicle, elongated take-up belt means engaging at its forward end portion to said tire chain means at a rearward end portion thereof, roller assembly means for engaging said take-up belt means and said first clamp means for rolling up said tire chain means about and upon said traction supporting member, and comprising hooking means for engaging said first clamp means to the rear bumper means of said vehicle, wherein said take-up belt means comprises housing means having at least one chamber, at least one take-up shaft extending through said chamber, an elongated flexible take-up belt normally wound around said take-up shaft, spring means engaging said take-up belt and said take-up shaft whereby a rewinding bias is exerted on one end of said belt for tending to rewind the same when drawn outwardly therefrom, and to maintain continuous tension thereon, whereby as said vehicle is moved forwardly a short distance, said tire chain means is wound around said tire and wheel and is positioned finally at a location peripherally for securing together fastening hooks at both now adjacently oriented ends of said tire chain.

6. A device for installing and removing tire chains from the wheels and tires of a vehicle in accordance with claim 1, comprising traction responsive means whereby the motive power of the vehicle is employed to draw and wind the tire chain about the rotating wheel for fastening the same about the wheel and tire.

7. A device for installing and removing tire chains from the wheels and tires of a vehicle in accordance with claim 1, comprising extension means for accommodating to smaller vehicles, such as Volkswagens, where the rear tires are situated close to the rear bumper, and comprising substantially "Z" shaped adjustable extension sleeve means carried by the device for effecting the necessary distance spacing between the body of the bumper clamped tire chain installing device and the extended tire chains, and adjustable plural part chain slide chute means constructed and arranged for attachment where the vehicle's fender construction, wheel well construction and the like, obstructs the smooth transfer of the tire chains from the device to the tires, whereby the chain slide chute comprises means for providing smooth and unimpeded transfer of the tire chains to the tires.

* * * * *